US007640343B2

(12) United States Patent
Scott, III

(10) Patent No.: US 7,640,343 B2
(45) Date of Patent: Dec. 29, 2009

(54) USING RESOURCE ITEM LISTS TO CONSUME RESOURCE ITEMS

(75) Inventor: Samuel Thomas Scott, III, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 978 days.

(21) Appl. No.: 10/857,688

(22) Filed: May 27, 2004

(65) Prior Publication Data

US 2005/0267949 A1 Dec. 1, 2005

(51) Int. Cl.
G06F 15/173 (2006.01)
G06F 15/16 (2006.01)
(52) U.S. Cl. .................. 709/226; 709/203; 709/219; 709/225; 709/229
(58) Field of Classification Search ......... 709/217–219, 709/225–226, 229, 202–203
See application file for complete search history.

(56) References Cited

U.S. PATENT DOCUMENTS

| 5,721,829 | A | | 2/1998 | Dunn et al. | |
|---|---|---|---|---|---|
| 6,026,439 | A | | 2/2000 | Chowdhury et al. | |
| 6,154,767 | A | * | 11/2000 | Altschuler et al. | 709/217 |
| 6,345,279 | B1 | * | 2/2002 | Li et al. | 709/217 |
| 6,662,231 | B1 | | 12/2003 | Drosset et al. | |
| 6,781,637 | B2 | | 8/2004 | Kimura | |
| 7,016,959 | B2 | * | 3/2006 | Dinh et al. | 709/229 |
| 7,054,935 | B2 | * | 5/2006 | Farber et al. | 709/226 |
| 7,089,309 | B2 | * | 8/2006 | Ramaley et al. | 709/226 |
| 7,263,535 | B2 | * | 8/2007 | Malik | 709/219 |
| 7,287,018 | B2 | * | 10/2007 | Lennon | 707/2 |
| 7,296,074 | B2 | * | 11/2007 | Jagels | 709/227 |
| 7,349,965 | B1 | * | 3/2008 | Graupner et al. | 709/226 |
| 7,418,512 | B2 | * | 8/2008 | England et al. | 709/229 |
| 7,451,236 | B2 | * | 11/2008 | Savitzky et al. | 709/219 |
| 7,451,450 | B2 | * | 11/2008 | Sankaranarayan et al. | 709/226 |

(Continued)

FOREIGN PATENT DOCUMENTS

| WO | WO0033565 A2 | 6/2000 |
|---|---|---|
| WO | WO 0033578 | 6/2000 |
| WO | WO 03/067594 | 8/2003 |

OTHER PUBLICATIONS

Microsoft, "Windows Media Services 9 Series in Windows Server 2003. Reviewer's Guide", Apr. 22, 2003, retrieved from the internet at <<http://download.microsoft.com/dowlnoad/7/8/0/78000263-3785-4cd8-be29-ac20371d12f8/Server_2003_RG_Final.pdr>> on Jun. 7, 2007.

(Continued)

Primary Examiner—Bharat N Barot
(74) Attorney, Agent, or Firm—Lee & Hayes, PLLC

(57) ABSTRACT

Strategies are described for creating a resource item list, for transferring the resource item list from one user to another user or to another destination, and for retrieving resource items from an operations center based on resource descriptors specified in the resource item list. The resource item list can include a number of attributes which are used to identify matching resource items in a content store of the operations center. A schema defines the contents and organization of entries in the resource item list. The use of resource item lists helps users discover and consume resource items of interest extracted from a larger pool of resource items.

29 Claims, 10 Drawing Sheets

U.S. PATENT DOCUMENTS

| | | |
|---|---|---|
| 7,502,859 B2 * | 3/2009 | Inoue et al. ................ 709/226 |
| 2003/0028505 A1 | 2/2003 | O'Rourke et al. |
| 2003/0163823 A1 | 8/2003 | Logan et al. |
| 2004/0117730 A1 | 6/2004 | Ibrahim et al. |
| 2004/0255336 A1 | 12/2004 | Logan et al. |
| 2005/0166258 A1 | 7/2005 | Vasilevsky et al. |

OTHER PUBLICATIONS

Yongshi, Yuan "Design and Realization of an Automatic Renewed Search Engine Based on RDF/XML", China Academic Journal Eletronic Publishing House, Apr. 2003, 4 pages.

Diriaux, "Key frame Selection to represent a video", Sep. 2000, Image Processing 2000, vol. 2, pp. 275-278.

* cited by examiner

Listing 1: MediaPlaylist.xsd (EXEMPLARY XML SCHEMA)

```xml
<?xml version="1.0" encoding="UTF-8"?>
<!-- (C) Microsoft Corporation. All Rights Reserved. -->
<xs:schema xmlns:xs="http://www.w3.org/2001/XMLSchema" elementFormDefault="qualified">
    <xs:element name="MediaPlaylist">
        <xs:complexType>
            <xs:sequence>
                <xs:element ref="MediaSequence"/>
            </xs:sequence>
        </xs:complexType>
    </xs:element>
    <xs:element name="MediaSequence">
        <xs:complexType>
            <xs:sequence>
                <xs:element ref="item" maxOccurs="unbounded"/>
            </xs:sequence>
            <xs:attribute name="itemCount" type="xs:string" use="required"/>
        </xs:complexType>
    </xs:element>
    <xs:element name="item">
        <xs:complexType>
            <xs:sequence>
                <xs:element ref="programReferenceIdentifier"/>
                <xs:element ref="programTitle"/>
                <xs:element ref="programAiringDate" minOccurs="0"/>
                <xs:element ref="programAiringService" minOccurs="0"/>
                <xs:element ref="programAiringTimeUTC" minOccurs="0"/>
                <xs:element ref="programDurationMinutes" minOccurs="0"/>
            </xs:sequence>
            <xs:attribute name="order" type="xs:string" use="required"/>
        </xs:complexType>
    </xs:element>
    <xs:element name="programAiringDate" type="xs:string"/>
    <xs:element name="programAiringService" type="xs:string"/>
    <xs:element name="programAiringTimeUTC" type="xs:string"/>
    <xs:element name="programDurationMinutes" type="xs:string"/>
    <xs:element name="programReferenceIdentifier" type="xs:string"/>
    <xs:element name="programTitle" type="xs:string"/>
</xs:schema>
```

Fig. 5

Listing 1: MediaPlaylist.xml (EXEMPLARY XML RESOURCE ITEM LIST)

```xml
<?xml version="1.0" encoding="UTF-8"?>
<!-- (C) Microsoft Corporation. All Rights Reserved. -->
<MediaPlaylist xmlns:xsi="http://www.w3.org/2001/XMLSchema-instance"
xsi:noNamespaceSchemaLocation="C:\Documents and Settings\tscott\My Documents\
MediaPlaylists.xsd">
        <MediaSequence itemCount="3">
                <item order="1">
                        <programReferenceIdentifier>{EE9C32E8-871B-45f6-894F-
                        58A321ED295F}</programReferenceIdentifier>
                        <programTitle>Rainforest Study</programTitle>
                        <programAiringDate>2003-07-23</programAiringDate>
                        <programAiringService>MSNBC</programAiringService>
                        <programAiringTimeUTC>00:03:00</programAiringTimeUTC>
                        <programDurationMinutes>30</programDurationMinutes>
                </item>
                <item order="2">
                        <programReferenceIdentifier>{D804ABDA-FA91-4531-9E2E-
                        3A8F533EB52C}</programReferenceIdentifier>
                        <programTitle>Global Warming Trends</programTitle>
                </item>
                <item order="3">
                        <programReferenceIdentifier>{D5E9EF91-9D70-4a90-A940-
                        C2B6C50C6330}</programReferenceIdentifier>
                        <programTitle>Industry: Carbon Monoxide</programTitle>
                        <programAiringDate>2002-02-13</programAiringDate>
                        <programDurationMinutes>60</programDurationMinutes>
                </item>
        </MediaSequence>
</MediaPlaylist>
```

*Fig. 6*

USING RESOURCE ITEM LISTS TO CONSUME RESOURCE ITEMS

TECHNICAL FIELD

This subject matter relates to strategies for presenting resource items to users, and, in a more particular implementation, to strategies for presenting collections of audio-visual media items to users.

BACKGROUND

Providers of media programs continue to expand the number of resource items from which consumers may select. For instance, traditional satellite and cable providers often offer hundreds of channels from which to select, each providing multiple resource items (e.g., television programs, movies, etc.). Internet-enabled providers of media programs have the potential to provide even greater quantities of resource items from which to select. The expanding array of choices benefits consumers by increasing the probability that the consumers will find resource items that meet their interests.

However, the explosion of resource items also introduces a number of challenges. For instance, with the ever-expanding pool of resource items, consumers may find it difficult to discover resource items that meet their interests. For instance, consumers may find it burdensome to sift through a great number of resource items to find resource items that meet their interests. While various search engines exist for facilitating the consumers' searches, many consumers may lack familiarity with these tools, especially those consumers who are not particularly computer savvy. Alternatively, many consumers may lack sufficient time or patience to use these search tools on a day to day basis.

There is accordingly a need for mechanisms that will facilitate the discovery of resource items from a larger pool of resource items, and the subsequent retrieval of such resource items.

SUMMARY

According to one exemplary implementation, a method is described for providing plural resource items from a content store. The method includes: (a) receiving a resource item list from a client processing device, the resource item list including plural resource item descriptors that identify resource items provided in the content store; (b) automatically retrieving the resource items identified by the resource item descriptors from the content store; and (c) providing the retrieved resource items to the client processing device for presentation thereat.

According to another exemplary feature, the resource item list is expressed in a markup language, such as the Extensible Markup Language (XML).

According to another exemplary feature, a schema governs the contents and organization of the resource item list.

According to another exemplary feature, each resource item descriptor includes plural attributes, a subset of which are optional.

According to another exemplary feature, the resource item list includes information that specifies an order in which the resource items are to be presented.

According to another exemplary feature, the above-mentioned retrieving determines that at least two resource items match at least one of the resource item descriptors in the resource item list. In this case, the method further includes selecting one of the resource items based on at least one consideration (such as a determination of the format preferences of the receiving client processing device).

According to another exemplary feature, the resource item list can be obtained from another client processing device. In other words, the method permits users to share resource item lists amongst themselves, or to download resource item lists from websites, etc.

Additional implementations and features will be described in the following.

BRIEF DESCRIPTION OF THE DRAWINGS

FIG. 5 shows an exemplary Extensible Markup Language (XML) schema used to implement the schema design of FIG. 4.

FIG. 6 shows an exemplary XML resource item list constructed based on the schema of FIG. 5.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Strategies are described herein for consuming resource items based on a resource item list. The term "resource item" refers to any kind of information resources that can be consumed by users. In one case, the resource items pertain to audio and/or visual media programs, such as music, still pictures, audio-visual motion pictures, and so on. In the case of audio-visual resources, the resource items can pertain to any kind of subject matter, such as serial-type dramas and comedies, documentaries, movies, talk shows, various kinds of sales presentations, news programs, weather information, financial information (e.g., stock information), and so on. In another case, the resource items pertain to executable computer programs that allow the user to interact with the programs (such as computer games, etc.). In another case, the resource items pertain to markup language resources (such as hypertext markup language resources).

The term "resource item list" refers to any kind of information used to identify one or more resource items. The resource item list can be expressed as an Extensible Markup Language (XML) document, a flat file, a spreadsheet document, a document created by a text editor, or in any other format.

The term "resource item descriptor" refers to any kind of information used to identify a resource item within a resource item list. As will be described, an exemplary resource item descriptor may include a collection of attributes. The term "attributes" refers to any kind of information that specifies respective properties of a resource item, such as a reference ID, name, title, etc.

This disclosure includes the following sections. Section A describes an exemplary system for consuming resource items using a resource item list. Section B describes the operation of the system of Section A. To facilitate discussion, the implementation most commonly evoked in the following discussion involves the dissemination of audio-visual resource items in streaming digital format over a packet network based on a media play list; however, as will be discussed, the functionality described herein can be applied to other types of resource items in other kinds of technical and commercial environments.

A. EXEMPLARY SYSTEM FOR CONSUMING RESOURCE ITEMS BASED ON A RESOURCE ITEM LIST

A.1. System Overview

Figure 1:
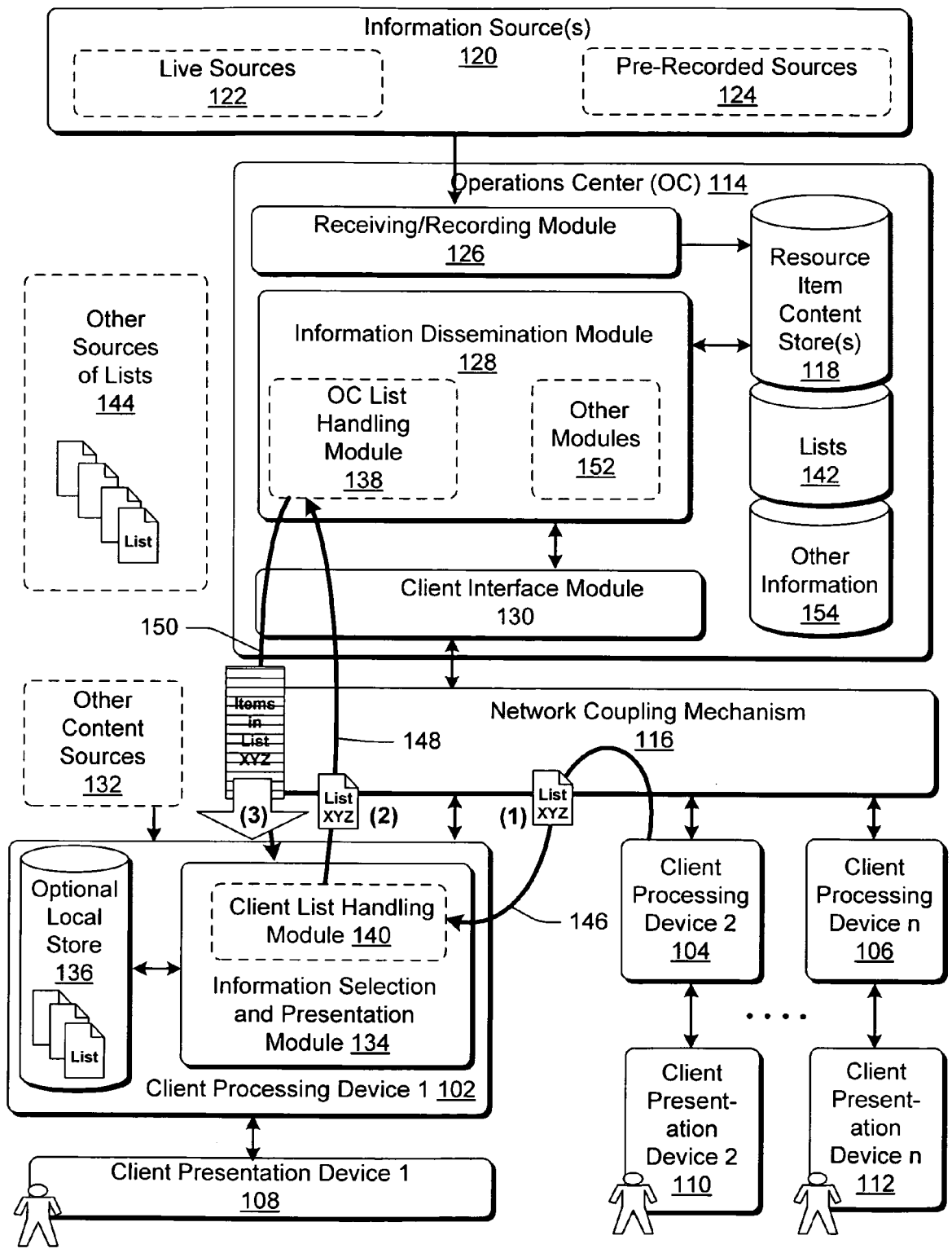
FIG. 1 shows an exemplary system for consuming resource items using a resource item list.

FIG. 1 shows an exemplary system 100 for consuming resource items based on a resource item list. By way of overview, the system 100 allows a user to create and/or receive a resource item list that identifies one or more resource items. For instance, a user may wish to create a resource item list, or receive an already created resource item list from another user or other source, that identifies resource items that have some common theme. The user can invoke this resource item list to automatically receive the resource items identified therein. These resource items can be presented to the user in the sequential order identified in the resource item list. Retrieval of resource items based on a resource item list provides a user-friendly approach to the consumption of resources, particularly where, without such a provision, the user would be forced to manually select individual resource items from a potentially vast pool of resource items. Additional features and attendant benefits of the retrieval of resource items based on lists will be described below.

Generally, any of the functions illustrated in the figures can be implemented using software, firmware (e.g., fixed logic circuitry), manual processing, or a combination of these implementations. The terms "logic," "module" or "functionality" as used herein generally represents software, firmware, or a combination of software and firmware. For instance, in the case of a software implementation, the terms "logic," "module" or "functionality" represents program code that performs specified tasks when executed on a processing device or devices (e.g., CPU or CPUs). The program code can be stored in one or more computer readable memory devices. The illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The system 100 includes a plurality of client presentations devices (102, 104, . . . 106). The client processing devices (102, 104, . . . 106) can be implemented in different ways to suit different technical and commercial environments. In one case, these client processing devices (102, 104, . . . 106) can represent set-top boxes or other application-specific units which couple to client presentation devices (108, 110, . . . 112), where the client presentation devices (108, 110, . . . 112) can represent televisions, stereo systems, or other kinds of information presentation devices. In an alternative implementation, the client processing devices (102, 104, . . . 106) can represent general computer devices which couple to their respective client presentations devices (108, 110, . . . 112). In still another example, the client processing devices (102, 104, . . . 106) can represent functionality that is integrated into the client presentation devices (108, 110, . . . 112) themselves (e.g., in the form of processing boards, detachable cards, etc.).

Figure 2:
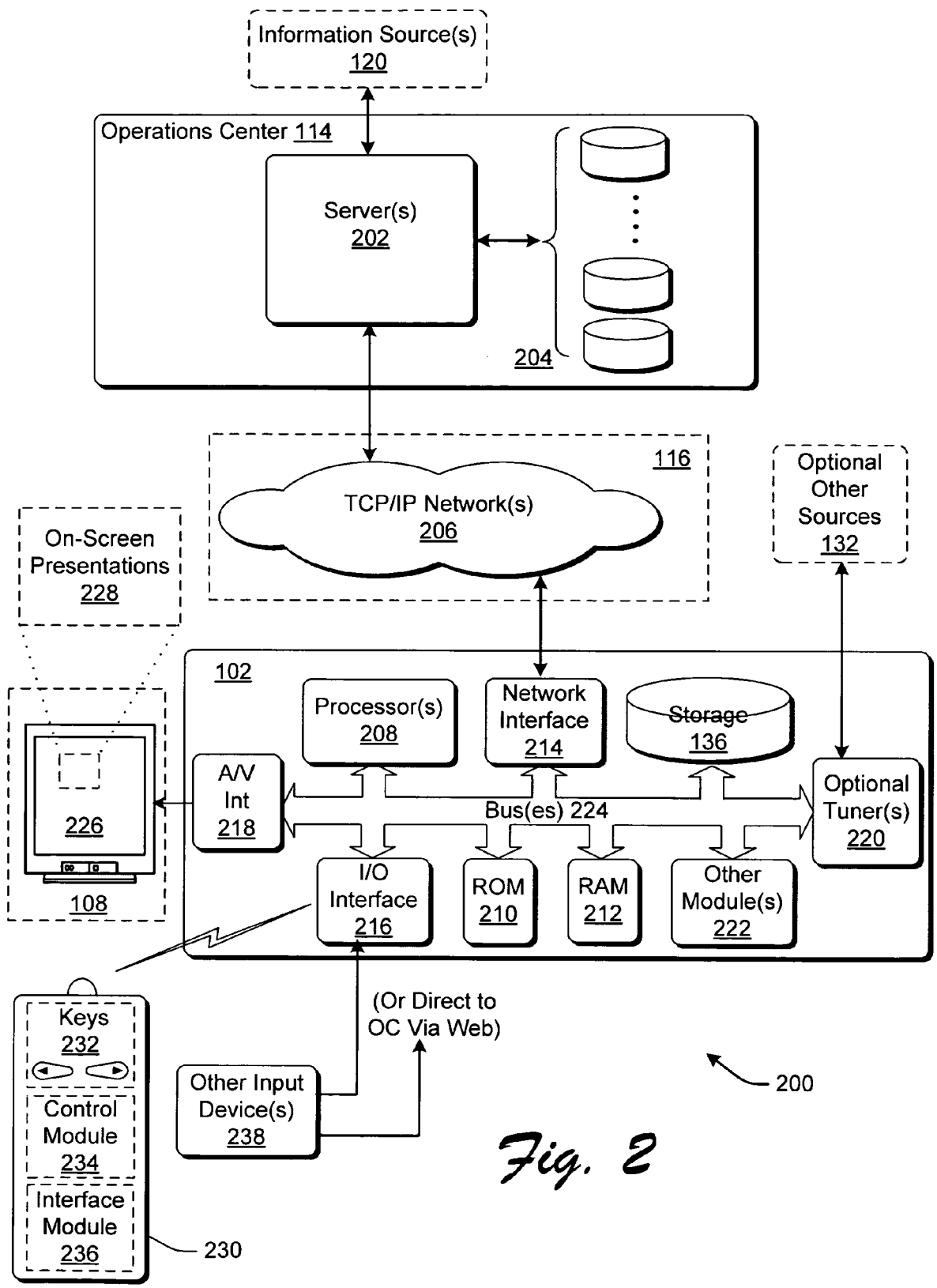
FIG. 2 shows one exemplary implementation of the system of FIG. 1.

The client processing devices (102, 104, . . . 106) can receive resource items (e.g., media programs) from one or more sources. One exemplary source is an operations center 114 coupled to the client processing devices (102, 104, . . . 106) via a network coupling mechanism 116 (such as the Internet). The operations center 114 center can generally represent any infrastructure for storing resource items and for distributing the resource items to users upon request over the network coupling mechanism 116. In one case, the operations center 114 can be implemented by computing functionality (e.g., one or more computer servers) housed at a particular site. In another case, the operations center 114 can be implemented in distributed fashion by computing functionality spread over multiple sites. In one case, a single entity can administer the operations center 114. In another case, multiple entities can collaboratively implement the operations center 114. For instance, in the latter case, plural partners can administer different operation centers which are collectively represented in FIG. 1 as the unified operations center 114. FIG. 2 (to be discussed below in turn) describes one technology-specific implementation of the system 100 shown in FIG. 1.

The operations center 114 includes an resource item content store 118 for storing the resource items (e.g., media programs). This content store 118 can represent a single database, or can represent multiple distributed databases spread over multiple respective sites. The resource items stored in the content store 118 can originate from a number of different sources, generically represented in FIG. 1 as "information sources" 120. The information sources 120 can represent any entity which produces or provides resource items, such as conventional commercial cable or satellite television providers, one or more commercial Video-On-Demand (VOD) entities, one or more publishing houses, one or more library sources of resource items, any kind of Internet-enabled repository of information, and so on. In one example, an entity that administers the operations center 114 can enter into a contractual arrangement with the entity (or entities) that supply the resource items. In another case, the entity that administers the operations center 114 can itself produce at least some of the resource items stored in the content store 118. In any event, the information sources 120 can fall into two principal categories. A first type corresponds to live sources 122. The live sources 122 correspond to sources that supply resource items that capture live events, or resource items that otherwise have some real-time aspect associated with them (such as a televised sporting event or news event, etc.). A second type of source corresponds to pre-recorded sources 124. The pre-recorded sources 124 correspond to sources that supply resource items that have been already recorded in their entirety. The operations center 114 includes a receiving/recording module 126 for receiving resource items from either the lives sources 122 or the pre-recorded sources 124 and storing these resource items in the content store 118.

An information dissemination module 128 is configured to handle users' requests for resource items by retrieving the requested resource items from the content store 118 and supplying the resource items to the appropriate client processing devices (102, 104, . . . 106) via the network coupling mechanism 116. The operations center 114 connects to the coupling mechanism 116 via the client interface module 130. The client interface module 130 can be implemented as a broadband coupling mechanism or other kind of coupling mechanism.

More specifically, the operations center 114 can apply a unicast paradigm in distributing resource items to client processing devices (102, 104, . . . 106). In the unicast approach, the operations center 114 sends a requested resource item to only that client processing device that requested it. This differs from the traditional broadcast paradigm. In the broadcast mode, a head-end station simultaneously provides a plurality of programs to a large pool of subscribers. The subscribers then locally tune their respective client processing devices to receive one or more programs of interest. In contrast, in the above-described unicast mode of transfer, the operations center 114 does not transfer any information until it is specifically requested by a user. The unicast mode therefore provides an economical point-to-point transfer of information compared to the broadcast mode. Further, in the unicast mode, the operations center 114 can simultaneously stream different parts of the same resource item to different respective users using potentially different transmission settings (e.g., different transmission rates), thereby allowing greater flexibility in information dissemination compared to the broadcast mode (where all of the subscribers receive the same information at the same time).

The operations center 114 can supply resource items to users using different program-packaging paradigms. In one case, the operations center 102 can group resource items into different respective "channels," and allow the users to select resource items by specifying channel identifiers. A single channel can provide a defined chronological sequence of resource items according to the traditional broadcast model of resource item delivery. In this case, the user can receive a desired resource item by "tuning" to the channel at a prescribed time. In another case, a single channel can provide a portal that allows the user to select from a subset of resource items associated with the channel. In this case, the user can receive a desired resource item by "tuning" to the channel at any time and selecting one of the resource items that the channel offers in an on-demand manner. In still another case, a single channel can be associated with a single resource item. In this case, the user can receive this resource item by "tuning" to the channel at any time and selecting this resource item in an on-demand manner. The above-described information delivery paradigm is advantageous because it conforms to a typical user's prior experience in dealing with the traditional broadcast delivery of resource items. That is, the channel paradigm may promote acceptance of the operations center services because the user may feel that he or she is already familiar with its method of operation. However, again, the operations center 102 employs a unicast point-to-point method of delivery, rather than broadcast. Accordingly, any reference to "channel" and "tuning" used herein (which were originally coined in the context of broadcast services) is to be understood as referring to the expanded meaning of these terms as explained above.

A specific scenario will further clarify one exemplary application of the system 100 of FIG. 1. Assume that the operations center 114 devotes itself to archiving television programs that are broadcast by a provider over a number of different channels from a certain starting date onward. The content store 118 thus serves as a large historical archive from which users can pull resource items, e.g., by specifying the date on which a resource item "aired," the time at which it aired, the service (e.g., channel) on which it aired, and so on. Further, as the operations center 114 is also archiving new resource items in real-time mode, it can also serve as a source of current media content for users. Again, this arrangement reflects only one exemplary business-related and technological application.

In addition to the operations center 114, or instead of the operations center 114, the client processing devices (102, 104, . . . 106) can receive resource items from other sources (generically referred to in FIG. 1 as "other sources 132"). Such other sources 132 may correspond to other operation centers that provide resource items in the manner described above, or might correspond to more traditional broadcast sources, such as conventional satellite or cable head-end sources. The client processing devise (102, 104, . . . 106) can receive resource items from broadcast sources by tuning to one or more selected resource items via local tuners (not shown in FIG. 1) in a conventional manner.

While the client processing devices (102, 104, . . . 106) can receive resource items from any source, to facilitate discussion by providing concrete examples, the following discussion will most commonly evoke the case where resource items are received from the operations center 114 (representing one or more computer servers) via the network coupling mechanism 116 (e.g., the Internet).

The client processing devices (102, 104, . . . 106) include information selection and presentation modules (such as exemplary module 134 of representative client processing device 102). These selection and presentation modules include functionality for receiving users' selections of resource items, for receiving selected resource items from any one of the above-identified sources, for presenting the selected resource items on respective client presentation devices (108, 110, . . . 112), and for performing other tasks to be described below. The client processing devices (102, 104, . . . 106) can additionally include local stores (such as exemplary local store 136 of representative client processing device 102).

With the above overview of the system 100 as a whole, attention will now be directed to the system 100's functionality for processing resource item lists. As described above, a resource item list corresponds to any kind of listing in any kind of format of one or more resource item descriptors. As will be described in greater detail below, a resource item descriptor can identify a corresponding resource item by providing reference information that indicates where the resource item can be retrieved from, title information, and other attribute information. Resource item lists can be compiled based on any criterion or combination of criteria. In one example, a user may wish to create or receive a resource item list that groups a collection resource items according to some common theme. Resource item lists can include instructions which prompt the operations center 114 to deliver the resource items in a suggested order.

Functionality for performing various tasks associated with the resource item lists (referred to as "list functionality" for brevity) includes an operations center (OC) list handling module 138 located at the operations center 114, and a client list handling module located at each client processing device (such as client handling module 140 located at client processing device 102).

More specifically, the client list handling module 140 can perform various functions. According to one such function, this module 140 can be configured to create resource item lists. There are many ways to perform this task. In one technique, the client list handling module 140 can create a resource item list by selecting resource item descriptors from a larger pool of resource item descriptors. Exemplary user interface functionality for performing this operation will be described below in Section A.3. Alternatively, the user can compile the resource item list from "scratch" using any kind of text editor. Still alternatively, the user can create a resource item list by combining two or more pre-existing resource item lists, or by editing a pre-existing resource item list in any manner (e.g., by adding resource item descriptors, deleting resource item descriptors, or modifying existing resource item descriptors). A client processing device can store any resource item lists that it creates (or receives) in its local store (such as local store 136 of client processing device 102).

The client list handling module 140 can also include functionality for sending a resource item list to another user or, more generally, to any recipient entity. For instance, a first user may create a resource item list that identifies resource items sharing a common theme. The first user can then transfer this resource item list to a second user, or can broadcast this resource item list to plural users. The first user can also transfer a resource item list to a remote repository, such as resource item list database 142 maintained by the operations center 114. In any case, the first user can perform this transfer in various ways. For example, the client list handling module 140 can include a custom designed user interface and associated transfer mechanism for performing this transfer. Alternatively, the client list handling module 140 can rely on existing message transmission tools to perform this transfer, such as existing email transmission tools.

The client list handling module 140 can also include functionality for receiving a resource item list from another user or, more generally, any source entity. For instance, the second user identified above can receive the resource item list that identifies resource items having a common theme from the first user. Any user can also receive a resource item list from a central repository of such resource item lists, such as the operations center 114's resource list database 142, or some other source of lists 144. For example, list source 144 may comprise an Internet-enabled website that allows users to select from a variety of resource item lists. Such a website can permit any user to receive resource item lists without restriction, or can charge a fee for downloading resource item lists (e.g., by either restricting access to the site to paying subscribers or by charging a fee for each individual resource item list downloaded by a user). In any case, again, the client list handling module 140 can use specifically tailored functionality for receiving the resource item list, or can rely on existing message transfer mechanisms for receiving the resource item list.

Finally, once a resource item list has been created or received, the client list handling module 140 includes functionality for invoking this resource item list to receive the resource items specified therein. One way to perform this task is to transfer the entire resource item list to the OC list handling module 138 for processing at this module. Another way to perform this task is to transfer only selected resource item descriptors to the OC list handling module 138. For instance, in the latter case, assume that the resource item list identifies a group of movies. The user may select only one of these movies and transfer corresponding descriptor information to the OC list handling module 138 to obtain this movie. Once again, the client list handling module 140 can use specifically tailored user interface and transmission functionality to perform the above transfer tasks, or can rely on existing general message transmission tools.

To facilitate discussion, it is assumed that the operations center 114 is the only head-end "actor" engaged in processing resource item lists. However, the system 100 can include multiple operations centers that service different respective groups of subscribing users. These multiple centers can be communicatively coupled together. Provisions can be put in place to ensure uniformity in list handling processing among the multiple operations centers. This permits users to use the services of "foreign" operation centers in various circumstances, possibly by paying a surcharge to use these services.

In any case, upon receiving the resource item list (or some part thereof), the OC list handling module 138 comes into play to provide the resource items identified in the resource item list. In one case, each resource item descriptor in the resource item list contains reference information that can be used to retrieve an associated resource item from the content store 118 (or from some other repository or source). That is, in this case, the reference information provides a link between the resource item descriptor and a particular entry in the content store 118. The OC list handling module 138 can then coordinate the retrieval of that particular resource item based on the reference information and provide it to the requesting client processing device.

More specifically, in one case, there may be a one-to-one correspondence between a particular resource item descriptor and a resource item in the content store 118. The match in this case is therefore unambiguous. In this case, the OC listing handling module 138 can retrieve this single matching resource item and provide it to the requesting user.

In other cases, however, a particular resource item descriptor may map into several matching resource items stored in the content store 118. The OC list handling module 138 can resolve this situation in different ways. According to one technique, the OC list handling module 138 can automatically select one or more of the matching resource items based on one or more considerations. For instance, the OC list handling module 138 can maintain a file that identifies each user's preferences pertaining to the receipt of resource items, and it can consult this file to determine, in the case of multiple matches, what matching resource items should be presented to the users. For example, assume that a user requests a movie, but there are several renditions of this movie that are stored in the content store 118. One user might have specified, in advance, that he or she wishes to receive movies having the highest quality provided (e.g., HDTV format). Another user might have specified, in advance, that the he or she wishes to receive movies that were originally aired by a certain source (e.g., that were originally aired on a particular television channel). Another user might have specified, in advance, that he or she wants to receive movies with the least amount of commercials, and so forth. Users may also specify multiple preference criteria, and also assign weighting scores associated with the respective criteria to reflect their importance. In this case, the OC list handling module 138 can rank the matching resource items based on the plural criteria and associated weighting scores, and provide the highest ranking resource item to a user. In one case, users may take active steps to send their preference criteria to the OC list handling module 138; in another case, the OC list handling module 138 can automatically discover the users' preference criteria, such as by polling the users' respective client processing devices to discover such criteria (e.g., by determining the formats in which the users' respective client processing devices and presentation devices are configured to receive resource items).

Still alternatively, the OC list handling module 138 can be configured to send a query to a user in the event that more than one stored resource item matches a resource item descriptor in their resource item list. For instance, the query can identify the matching resource items and their respective properties and permit the user to select one or more of them, whereupon the selected resource items are retrieved from the content store 118 and sent to the user.

The OC list handling module 138 can also enable up-selling and cross-selling opportunities. For instance, even if there is an exact one-to-one match between a resource item descriptor and a resource item stored in the content store 118, the OC list handling module 138 can alert the user to the fact that there is a related resource item that can be consumed, in place of, or in addition to, the matching resource item. This gives the user the opportunity to select the alternative resource item. Up-selling and cross-selling provisions can also be applied in the case that a resource item descriptor matches several resource items stored in the content store 118. For instance, the OC list handling module 138 can automatically pick one of the multiple matching resource items based on various marketing considerations, or can suggest a resource item that is related to the matching resource items.

Whatever matching circumstance applies, once matching resource items are identified, the dissemination module 128 can transfer these matching resource items to the requesting user in streaming mode (where the content is streamed to the user's client processing device in real-time or in substantially real-time fashion). Alternatively, the dissemination module 128 can send the matching resource items to the user in bulk mode, e.g., as a file that can be stored by the user's client processing device and played by the user at a time of his or her choosing. In any case, the OC list handling module 138 can be configured to transfer the resource items in the order specified in the resource item list, or in another order determined by the OC listing handling module 138.

FIG. 1 summarizes the operation of the client list handling module 140 and the OC listing handling module 138 by illustrating a series of operations performed in the system 100 in one exemplary scenario. In this scenario, one client processing device 104 sends a resource item list (e.g., List XYZ) to another client processing device 102. This transfer is represented by a first path 146. Upon receipt, the user of the other processing device 102 can invoke the resource item list by transferring the entire resource item list to the OC list handling module 138 in order to retrieve the resource items identified in the resource item list. This transfer is represented in FIG. 1 as path 148. Alternatively, the user of the other processing device 102 can forward only certain entries from the resource item list to the OC list handling module 138. In either case, the OC list handling module 138 can respond by streaming the requested resource items to the client processing device 102, or by transferring the resource items en bloc, e.g., as a single file or collection of files. This transfer is represented as path 150.

To yet further clarify the operation of the system 100, the following discussion identifies three exemplary applications of the list functionality. In a first example, assume that a parent in household "A" builds a resource item list that identifies four programs that her children enjoy watching on a certain television channel. A parent of household "B," a friend of the parent of household "A," also has children, and would like recommendations regarding suitable programs to present to his own children. To help the parent of household "B," the parent of household "A" can email her resource item list to the parent of household "B," allowing the children of household "B" to watch the four programs that have been recommended by the parent of household "A." In one implementation, the programs have been archived on in the content store 118 of the operations center 114, so there neither household need store copies of the actual referenced programs.

In a second example, assume that an entertainment website is running a feature regarding a prominent actress. A link on the website allows users to download a resource item list that identifies award-winning movies that feature this actress. The user can download this resource item list and then present it to the operations center 114 to obtain the actual resource items, or the user can instruct the website to directly transfer the resource item list to the operations center 114 for processing. For example, the entity that administers the operations center 114 may itself sponsor this website to promote consumption of its resource items. Or an entity associated with one of the information sources 120 may sponsor this website for the same reason.

In a third example, assume that a professor is designing a university course that pertains to environmental awareness. The course requires students to view a collection of television documentaries regarding global warming that originally aired within the past three years. A resource item list can be created that identifies these resource items and the order in which they are to be presented to students. The students taking the class can access the resource item list and consume the resource items in the suggested order identified in the list.

The above scenarios are merely illustrative; the list functionality has a great number of additional applications.

Further, the client list handling module 140 can apply other techniques for receiving resource items from other sources 132 (such as broadcast sources). For instance, suppose that the resource item list identifies resource items that can only be obtained from a conventional broadcast source, such as a conventional cable or satellite broadcast source. In this case, the client list handling module 140 can be configured to tune a tuner (not shown) of the client processing device 102 to receive the resource items transmitted by the broadcast sources 132. For example, assume that a resource list identifies three television shows airing at 7:00 PM, 8:30 PM and 10:30 PM on a particular day, but on three different broadcast channels. The client list handling module 140 can receive the television shows by automatically and successively tuning the tuner of the client processing device 102 to receive these programs at the allotted respective times.

Still further variations of the above-described list functionality can be implemented by the system 100. For instance, the list functionality can be implemented entirely in local mode without interaction with the operations center 114 or the other content sources 132. Assume, for example, that the local store 136 of client processing device 102 contains a jukebox repository of resource items, such as movies. The user of this device 102 can create a resource item list or receive a resource time list, which culls a subset of resource items from the local store 136 for playback.

Further, in any of the above implementations, the entity that submits the resource item list need not be the entity which receives the associated resource items. The resource item list can include information that identifies an alternative recipient of such resource items (or this information can be conveyed by some other source of routing information besides the resource item list).

Sections A.2 and A.3 below provide yet further details regarding exemplary features of the list functionality.

To conclude the discussion of FIG. 1, other features of the dissemination module 128 are generally represented in FIG. 1 by the module generically labeled "other modules" 152. Other information maintained by the operations center 114 is generally represented in FIG. 1 by the store generically labeled "other information" 154. As the primary focus of this disclosure concerns the list functionality, a detailed discussion of such other modules 152 and other information 154 will be omitted here.

FIG. 2 provides further details regarding one exemplary implementation 200 of the system 100 shown in FIG. 1. In FIG. 2, the operations center 114 can be implemented as one or more computer servers, such as a farm of computer servers. A computer server refers to a computer device that is configured to provide a service to requesting client processing devices. Although not shown, a computer server can include one or more processors (e.g., CPUs), random access memory (RAM), read only memory (ROM), various media storage drives, various network interface functionality, various input and output devices, various internal coupling mechanisms (such as buses), and so on. The operations center 114 can dedicate different servers 202 to handling different functions provided by the operations center 114, such as administrative tasks, receiving/recording tasks, resource item dissemination tasks, and so on. The operations center 114 can alternatively, or in addition, allocate plural servers 202 to performing the same tasks using various load balancing algorithms to meet client demand for services. As mentioned above, the functionality associated with the operations center 114 can be implemented at a single site or distributed over plural sites.

The information content store 118, user resource item list store 142 and other information store 154 shown in FIG. 1 can be implemented by the collection of data stores 204 shown in FIG. 2. These data stores 204 can represent any kind of magnetic storage media, optical storage media, solid state type storage media, or other kind of storage media. The data stores 204 can be maintained using any kind of database management technology. The data stores 204 can be implemented at a single site or distributed over plural sites.

In one implementation, the network coupling mechanism 116 can be implemented as a wide area network (WAN) 206 governed by the TCP/IP protocols (such as the Internet). Such a network can include various hardwired and/or wireless communication links, routers, gateways, name servers, and so on (not shown). Other types of networks can be used besides a TCP/IP WAN 206, such as an intranet, a LAN network, various kinds of wireless communication networks, and so on.

As noted above, the computer processing devices (102, 104, . . . 106) can be implemented as set-top boxes or other application-specific units (such as game consoles, e.g., Xbox™ game consoles produced by Microsoft Corporation of Redmond, Wash.), general purpose computer devices, processing mechanisms integrated into the client presentation devices (108, 110, . . . 112) themselves, or other implementations. In any case, as illustrated by exemplary client processing device 102, the client processing devices can include one or more processors 208 for executing machine readable code, ROM memory 210 and RAM memory 212 for storing machine readable code and other data, a network interface 214 for interacting with the operations center 114 via the TCP/IP network 206, local storage 136, an I/O interface 216 for interacting with one or more user input devices, an audiovisual (A/V) interface 218 for interacting with the client presentation device 108, one or more optional tuners 220 for receiving conventional broadcast resource items from the other sources 132, and various other modules 222. One or more busses 224 couple all of the above-identified components together and coordinate their cooperation.

The client presentation device 108 is shown FIG. 2 as a television 226, although the client presentation device 108 could also be implemented as a stereo output system, other some other kind of media output device. In other cases, the client presentation device 108 can represent a combination of different output devices working in cooperation to present media resource items. The client processing device 102 can be configured to present one or more on-screen user interface presentations 228 to assist the user in interacting with the services provided by the operations center 114.

A remote controller 230 serves as one possible input device. A user can use the remote controller 230 to select resource items, to pause resource items, to resume previously paused resource items, and for performing other tasks. As generally shown in FIG. 2, the remote controller 230 includes a collection of keys 232, a control module 234 for processing the user's actuation of the keys 232 to provide user instructions, and an interface module 236 for transmitting the user's instructions to the client processing device 102 via wireless communication (e.g., infrared communication). Function specific keys can be devoted to interacting with resource item lists, such as one or more keys to create a list, one or more keys to view a list, one or more keys to transmit or receive a list, one or more keys to invoke a list, and so on.

A number of other input devices 238 can be used to interact with the services provided by the operations center 114, in addition to, or as substitute for, the remote controller 230. For example, the other input devices 238 can represent a keyboard, a mouse-type input device, a joystick, and so on. Alternatively, a user can user a separate computer device (such as a general purpose computer, a laptop computer, etc.) to enter commands to the operations center 114 and to receive feedback from the operations center 114, to thereby control the presentation of resource items on the client presentation device 108. This functionality can be achieved by coupling the separate computer device directly to the client processing device 102; this enables the client processing device 102 to directly receive commands from the separate computer device. Alternatively, this functionality can be achieved by coupling the separate computer device directly to the operations center 114 via the TCP/IP WAN network 206; in this case, the operations center 114 can forward the user's commands back down to the client processing device 102 to thereby control the presentation of resource items on the client presentation device 108.

The implementation 200 is only exemplary; the system 100 shown in FIG. 1 can be implemented in other kinds of technical and commercial environments besides that shown in FIG. 2.

A.2. Resource Item List Functionality

Figure 3:
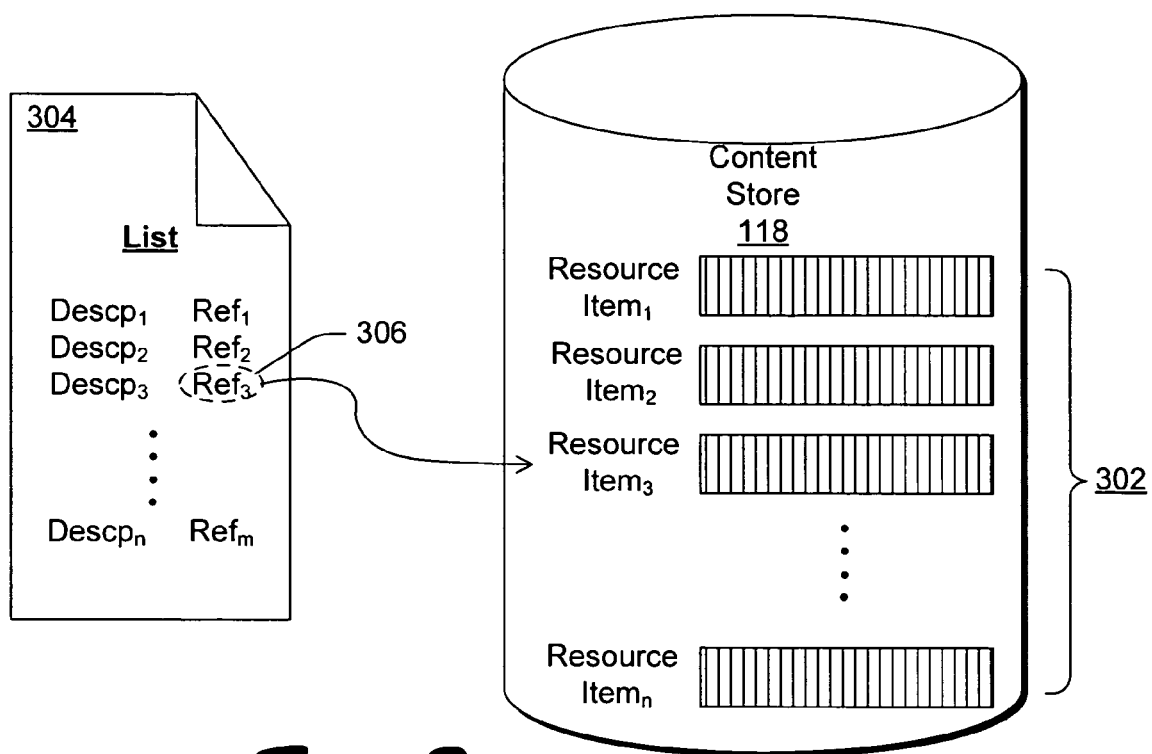
FIG. 3 shows an exemplary correlation between resource item descriptors in a resource item list and associated resource items provided in a content store used in the system of FIG. 1.
Figure 4:
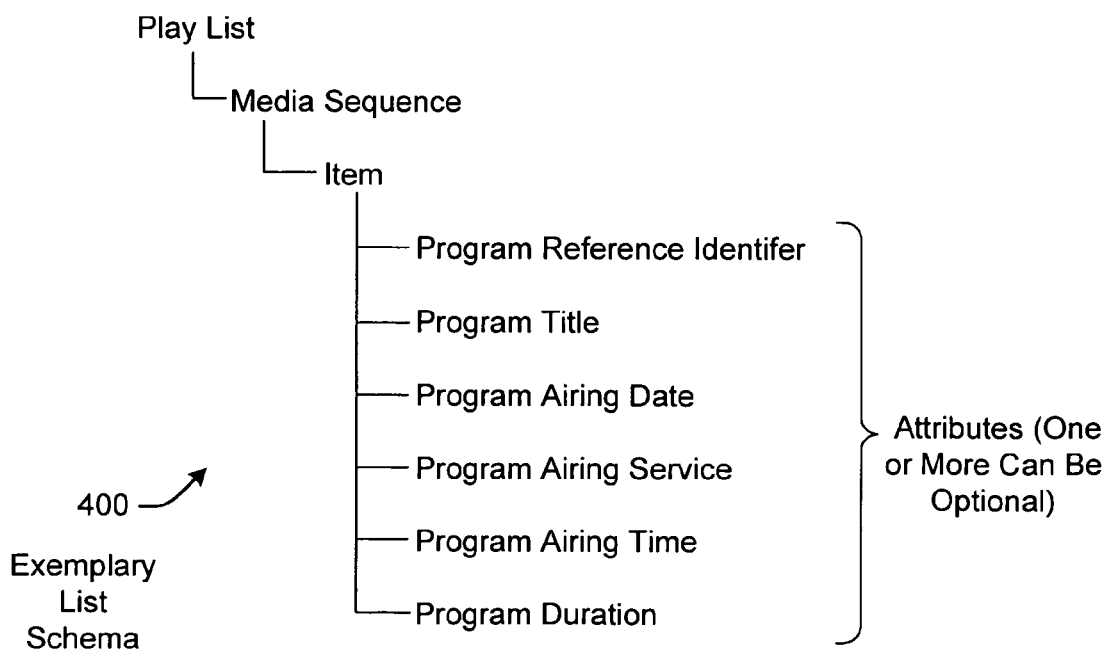
FIG. 4 shows an overview of an exemplary schema for forming a resource item list.

FIGS. 3 and 4 illustrate additional features of the list functionality, namely the functionality provided by the client list handling module 140 and the OC list handling module 138. To begin with, FIG. 3 indicates that the content store 118 stores a plurality of resource items ($Item_1$-$Item_n$) 302. The contents of the resource items 302 are depicted as respective streams of information to conceptually illustrate the temporal manner in which these resource items can be distributed and consumed by users.

A resource item list 304 specifies multiple resource item descriptors ($Descp_1$-$Descp_m$). The source item list 304 typically specifies only a small subset of the total number of resource items ($Item_1$-$Item_n$) in the content store 118 (that is m<<n), but this need not be so. These resource item descriptors can include various fields. One field for each resource item descriptor can include a link (e.g., denoted as "Ref" in FIG. 3) which points to one or more resource items stored in the content store 118. For instance, one resource item descriptor has a reference ($Ref_3$) 306 which points to Resource $Item_3$ in the content store 118. Thus, this reference (Ref$_3$) 306 can be used to retrieve Resource Item$_3$ and distributed it to the user who submitted the resource item list. Alternatively, the user may have only transmitted the single resource identifier (Ref$_3$) 306 to the OC list handling module 138, rather than the entire resource item list 304.

FIG. 4 shows an overview of an exemplary schema 400 that can be used to structure the resource content list. First, the schema 400 identifies the resource item list itself (e.g., note the Play List entry in the schema 400). Next the schema 400 optionally identifies a sequence which defines the preferred order in which the resource items should be played (e.g., note the Media Sequence entry in the schema 400). Next the schema 400 defines a number of attributes used to define the resource item that is being sought. One or more of these attributes are optional, meaning that they can be omitted, and, if so, do not play a role in the matching performed by the OC list handling module 138.

More specifically, a "Program Reference Number" attribute identifies reference information that can be used to retrieve a resource item from the content store 118. A "Program Title" attribute provides alpha-numeric information that identifies the desired resource item's title (such as a movie title). A "Program Airing Date" attribute specifies a date when a desired resource item was presented by a media provider. For example, assume that the content store 118 archives programs that have been presented to users according to a fixed time schedule. The Airing Date attribute specifies one of the dates on which the provider presented the desired resource item according to this fixed time schedule. A "Program Airing Service" attribute identifies the provider who aired the desired resource item (such as the channel on which the resource item was originally aired). A "Program Airing Time" attribute identifies a time when the desired resource item was aired. And a "Program Duration" attribute identifies the running length of the desired resource item.

The above-identified attributes are exemplary. As stated above, one or more of these attributes can be omitted. Or other attributes can be included in addition to those shown in FIG. 4. In general, a creator of a resource item list can specify many attributes for a resource item descriptor to more precisely pinpoint a desired resource item. On the other hand, a creator can specify fewer attributes if the creator wishes to use a wider "net" to identify matching resource items, and therefore "catch" more resource items.

The schema structure shown in FIG. 4 can be implemented in different technology-specific formats. FIG. 5 shows one exemplary Extensible Markup Language (XML) schema that can be used to implement the schema structure shown in FIG. 4.

FIG. 6 shows an example of a resource item list constructed based on the schema design overview shown in FIG. 5. In general, this resource item list is being used to identify three programs that have a bearing on a particular theme of interest, namely, rain forest studies. The creator of this list intends for the three resource items to be played in sequence to optimize comprehension of the material.

In this resource item list, a MediaSequence field specifies that that there are three resource item descriptors in the list that identify three respective resource items to be played in order. The order of each resource item in the list is identified by an "item order" field associated with each resource item descriptor (e.g., item order='1' for the first resource item descriptor). The first resource item descriptor in the resource item list is specified with many attributes, namely, a program reference attribute, a program title attribute, a programming airing date attribute, a program airing service attribute, a program airing time attribute, and a program duration attribute. Accordingly, in the event the content store 118 provides several resource items having the same title, then this resource item descriptor should precisely specify one of them. In contrast, the second resource item descriptor specifies only the program reference attribute and the program title attribute, and accordingly casts a wider "net" for retrieving matching resource items compared to the first resource item descriptor. Finally, the third resource item descriptor specifies a program reference attribute, a program title attribute, a program airing date attribute, and a program duration attribute. The third resource item descriptor therefore defines a level of matching specificity that lies somewhere between the first resource item descriptor and the second resource item descriptor.

A.3. Exemplary User Interface Functionality

Figure 7:
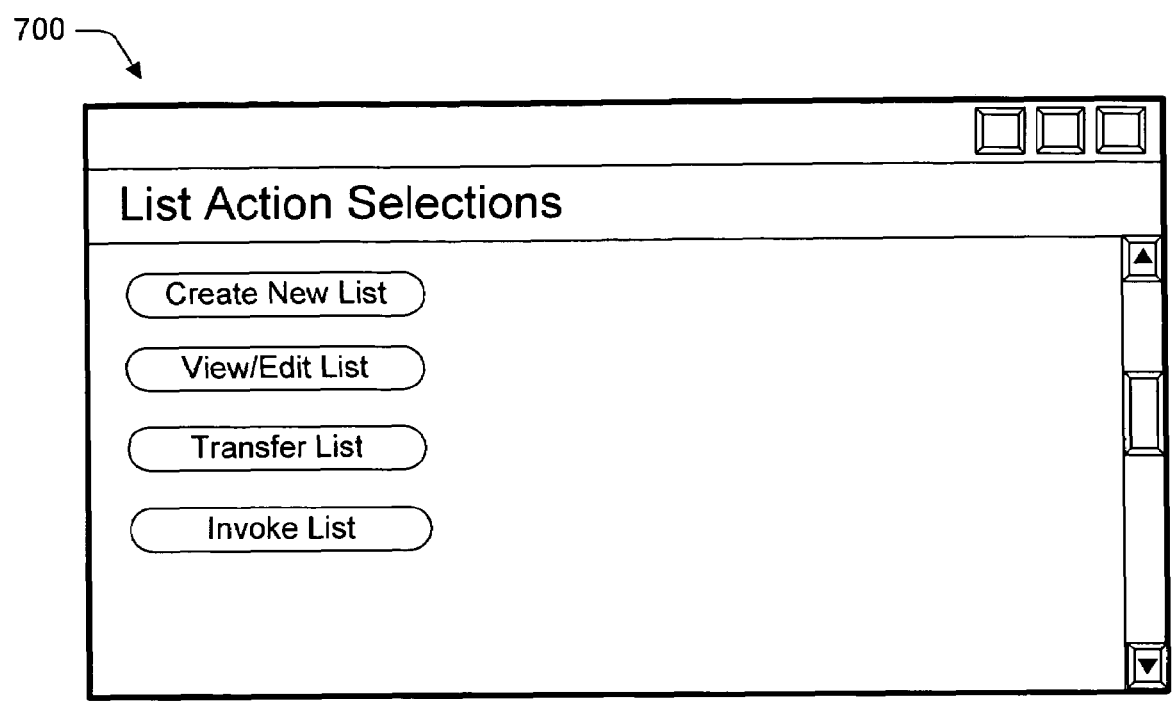
FIGS. 7-9 show exemplary user interface presentations for interacting with the system of FIG. 1.
Figure 8:
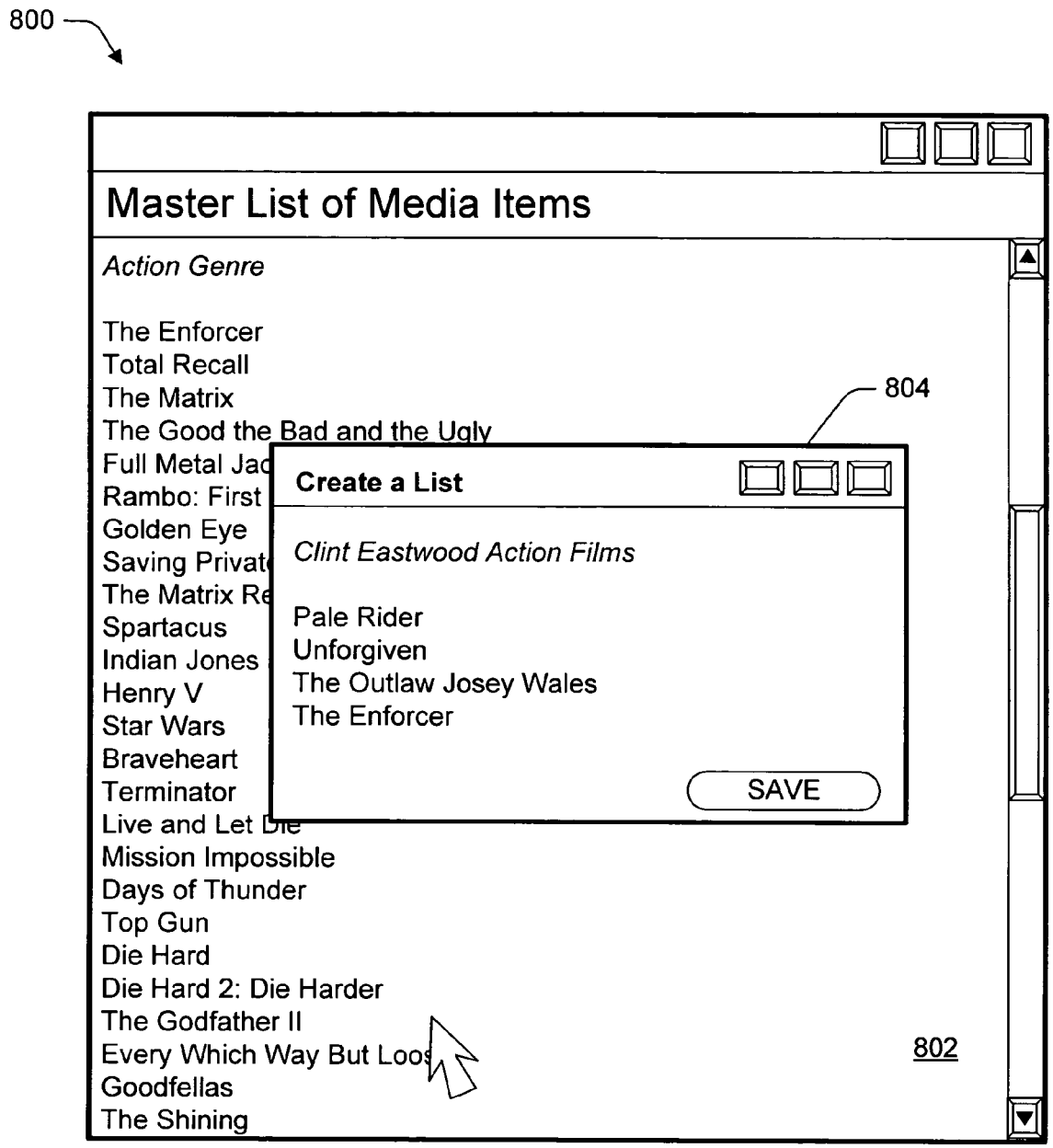
Figure 9:
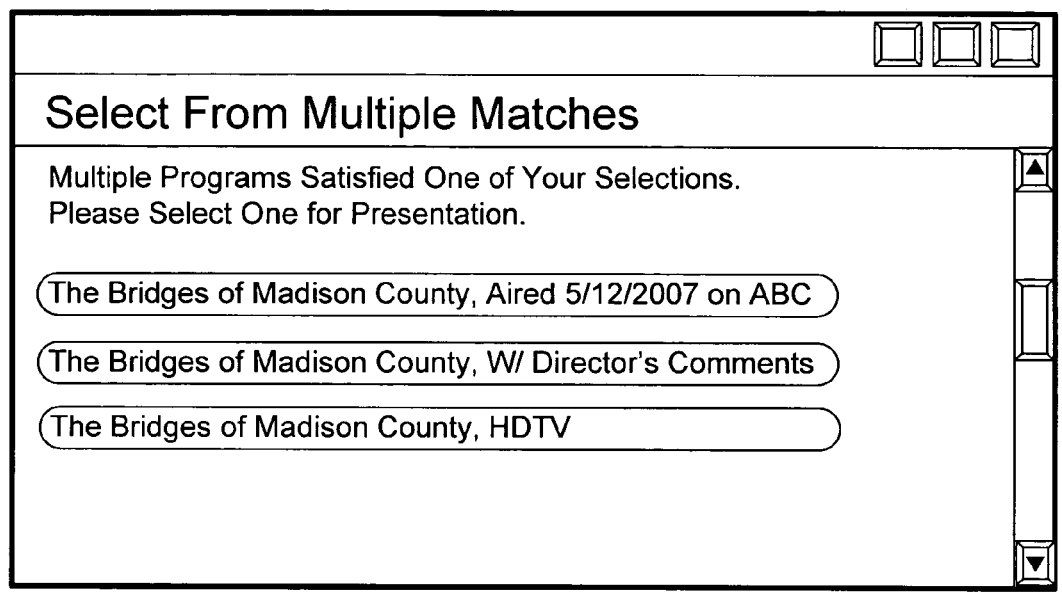

The client processing devices (102, 104, . . . 106), in conjunction with the OC list handling module 138, can present user interface presentations 228 to facilitate the creation of resource item lists and subsequent user interaction with the resource item lists. FIGS. 7-9 show three illustrative and exemplary such user interface presentations 228.

FIG. 7 shows an introductory user interface presentation 700 which displays a menu that allows the user to take various actions with regard to the resource item lists. One option is to create a new resource item list. Another option is to view or edit a pre-existing resource item list. Another option is to transfer a resource item list to a recipient entity, such as another user or a remote repository of lists. Another option is to invoke a resource item list, prompting, in one implementation, the OC listing handling module 138 to retrieve the resource items identified in the list.

FIG. 8 shows one of many user interface presentations 800 that can be used to create a resource item list. In the case shown here, the user has activated a master list 802 of resource items, namely, a master list of movies within the action genre. In one implementation, a third part may furnish the master list over the Internet as a publicly accessible resource. To create a resource item list from this master list, the user can invoke the sub-panel interface 804. This sub-panel interface 804 serves as a container for receiving resource item descriptors that will populate the created resource item list. For instance, in this case, the user wishes to compile a resource item list that features action movies starring a certain movie actor. The user interface presentation 800 can allow the user to transfer entries from the master list to the created resource list by dragging and dropping resource item titles into the sub-panel interface 804, or by using some other technique. The sub-panel interface 804 can include text editing functionality that allows the user to arrange the order of the resource item descriptors in the created list, and so forth. In one implementation, an underlying application can be used to automatically build the XML version of the created resource item list by mapping information in the created resource item list into the predetermined format specified by the schema shown in FIG. 5. Alternatively, the user remains free to write an XML resource item list document from scratch, e.g., using any kind of text editor.

When the user eventually commands the operations center 114 to play the compiled resource item list, the OC list handling module 138 may locate, for a particular resource item, multiple matching resource items provided in the content store 118. In response to this scenario, the OC list handling module 138 can be configured to automatically select one of the matching resource items based on one or more criterion.

For instance, as explained above, the OC list handling module 138 can decide to present a matching resource item that is best adapted for presentation on the type of client processing device that the requesting user is using (e.g., on one end of the scale, an HDTV television, and, on the other end of the scale, a portable viewing device having a relatively low resolution picture).

However, the OC list handling module 138 can alternatively allow the user to expressly pick one of the multiple matching resource items. The user interface presentation 900 shown in FIG. 9 allows the user to perform this operation. In this example, the user interface presentation 900 identifies three matching resource items, all pertaining to the same movie, but otherwise having different properties or metadata associated therewith. This presentation 900 gives the user the option to select one or more of these resource items for presentation.

The type of user interface presentation 900 shown in FIG. 9 can also be used for cross-selling and up-selling, as was discussed above in Section A.1. For instance, even if there is an exact one-to-one match for a particular resource item descriptor, the OC list handling module 138 can present multiple resource items for review by the user based on some kind of marketing consideration.

B. EXEMPLARY METHOD OF OPERATION

Figures 10, 11:
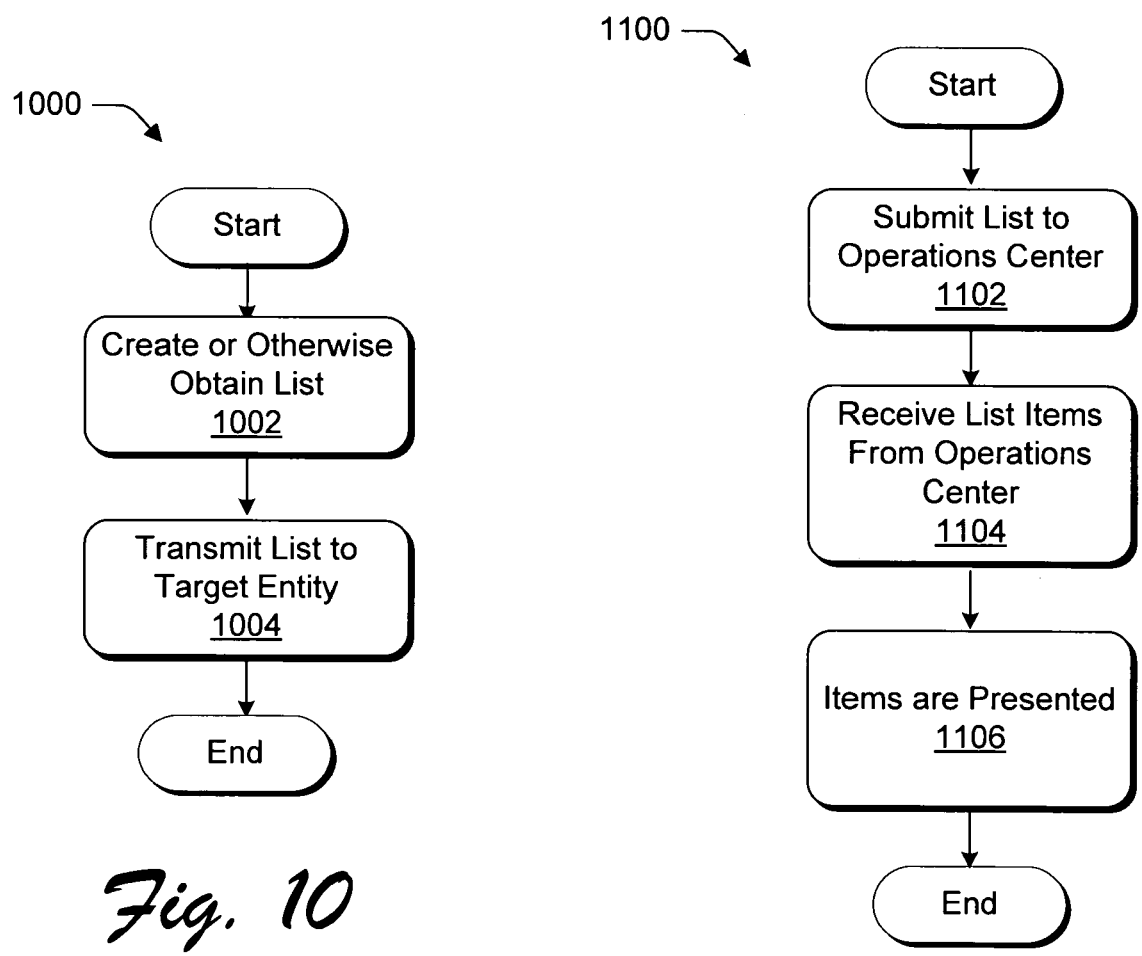
FIGS. 10-12 show a collection of flowcharts for explaining the operation of the system of FIG. 1.
Figure 12:
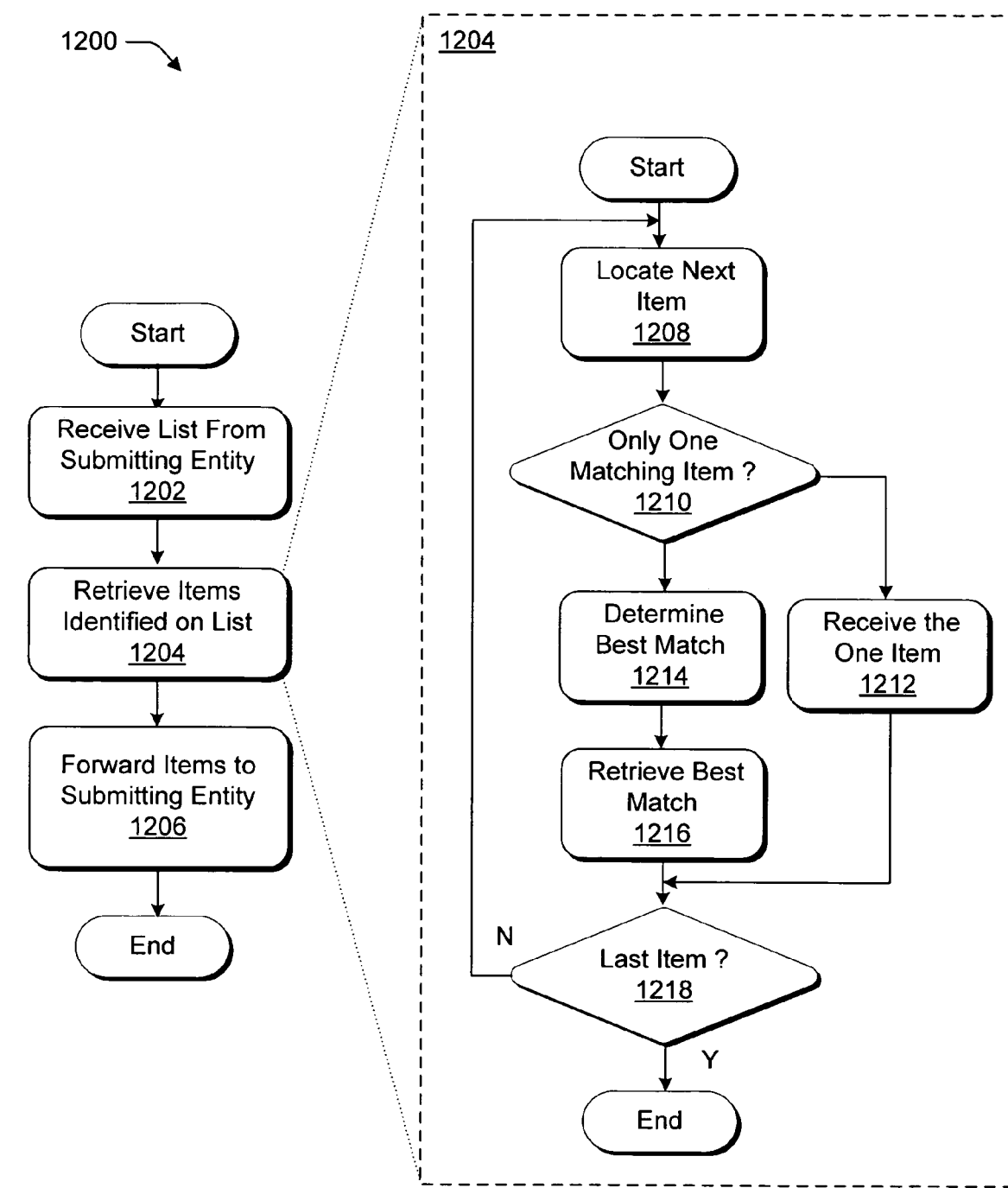

FIGS. 10-12 describe the operation of the system 100 of FIG. 1 in flowchart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

FIG. 10 shows a procedure 1000 for creating a resource item list and transmitting it to a recipient entity, such as another user or a remote repository. In step 1002, the user creates the resource item list, or otherwise obtains it. As noted above, this can be accomplished in various ways, such as by using a drag and drop technique in which the user transfers resource item descriptors from one list to another. Or the user can write the resource item list from scratch. Or the user can create the resource item list by modifying one or more existing resource item lists. Or the user can receive a pre-existing resource item list from any source entity, such as another user, a remote repository of resource item lists, etc.

In step 1004, the user can transfer the resource item list created or obtained in step 1002 to a destination (i.e., target) location, such as another user or a remote repository of resource item lists. This transfer can be performed using custom designed list exporting functionality, or by using general purpose message transmission tools (e.g., an email transmission tool).

FIG. 11 describes a procedure 1100 for forwarding a resource item list (or some part thereof) to the operations center 114, and, in response, receiving the resource items specified in the list. That is, in step 1102, the user commands his or her client processing device to forward the resource item list (or some part thereof) to the operations center 114. In step 1104, the user receives the resource items that were specified in the resource item list from the operations center 114. The operations center 114 can transfer these resource items to the user in a prescribed order identified in the resource item list. In step 1106, the receiving client processing device presents the resource items on its associated client presentation device.

Finally, FIG. 12 shows a procedure 1200, performed by the operations center 114, for processing resource item lists forwarded to it by the client processing devices (102, 104, . . . 106). In step 1202, the OC list handling module 138 receives a resource item list. In step 1204, the OC list handling module 138 retrieves the resource items identified in the resource item list. This can be performed by matching the attributes of the resource item descriptors with identifying information associated with the resource items in the content store 118. In step 1206, the OC list handling module 138 forwards the retrieved resource items to the requesting client processing device. It can do this in streaming mode, bulk mode as a single file or multiple files, or some other mode. 15 FIG. 12 shows exemplary operations involved in performing step 1204 to the right of step 1204. In step 1208, the OC list handling module 138 identifies the next resource item descriptor to process, which, at the outset, will correspond to the first descriptor entry in the list. In step 1210, the OC list handling module 138 determines whether there is a one-to-one correspondence between the resource item descriptor and a resource item stored in the content store 118. If this is the case, then, in step 1212, the OC list handling module 138 retrieves the one matching item. If there are multiple matches, then, in step 1214, the OC handling module 138 determines the best match based one or more of the considerations discussed in Section A. Then, in step 1216, the OC list handling module 138 retrieves the determined best match from the content store 118. Step 1218 indicates that the above-described procedure is repeated for each resource item descriptor in the resource item list.

In closing, a number of examples will be presented in this disclosure in the alternative (e.g., case A or case B). In addition, this disclosure encompasses those cases which combine alternatives in a single implementation (e.g., case A and case B), even though this disclosure may not expressly mention these conjunctive cases in every instance.

More generally, although the subject matter has been described in language specific to structural features and/or methodological acts, it is to be understood that the invention defined in the appended claims is not limited to the specific features or acts described. Rather, the specific features and acts are disclosed as exemplary forms of implementing the claimed invention.

What is claimed is:

1. A method for providing plural audio/video media programs from a content store, the method comprising:
   receiving a user-created resource item list from a client processing device, the user-created resource item list including plural resource item descriptors that identify at least one or multiple audio/video media programs provided in the content store, wherein the content store comprises multiple distributed databases including pre-recorded sources and new resources archived in a real-time mode;
   invoking the user-created resource item list;
   automatically retrieving the audio/video media programs identified by the resource item descriptors from the content store, wherein when more than one audio/video media program matches at least one of the resource item descriptors, the automatically retrieving further comprises:
      discovering weighted preference criteria associated with a user of the user-created resource item list, the discovering selected from a group comprising:
         consulting a maintained file that identifies weighted user preferences pertaining to the user; and
         polling the client processing device of the user to obtain weighted user preferences pertaining to the user and to determine formats in which the client processing device is configured to receive audio/video media programs;

determining a preferred audio/video media program based on an analysis of weights of the weighted preference criteria;

alerting the user that the preferred audio/video media program is available for consumption; and giving the user an opportunity to retrieve the preferred audio/video media program;

providing the retrieved audio/video media programs to the client processing device for a presentation thereat.

2. The method according to claim 1, wherein the user-created resource item list is expressed in a markup language.

3. The method according to claim 2, wherein the markup language is the Extensible Markup Language (XML).

4. The method according to claim 1, wherein a schema governs the contents and organization of the user-created resource item list, the schema comprising an identification of the user-created resource item list, a sequence defining a preferred order in which resource items should be played and at least one or more attributes.

5. The method according to claim 1, wherein each resource item descriptor includes at least one attribute comprising a Program Reference Number, a Program Title, a Program Airing Date, a Program Airing Service, a Program Airing Time, or a Program Duration.

6. The method according to claim 5, wherein each resource item descriptor includes plural attributes, a subset of which are optional.

7. The method according to claim 1, wherein the user-created resource item list includes information that specifies an order in which the audio/video media programs are to be presented.

8. The method according to claim 1, further including selecting one of at least two audio/video media programs based on at least one consideration.

9. The method according to claim 8, wherein the at least one consideration pertains to a picture resolution of a rendering client presentation device that will render the selected resource item.

10. A method for retrieving plural resource items from a content store of an operations center, comprising:

obtaining, at a client processing device, a resource item list, the resource item list including plural resource item descriptors that identify respective resource items provided in the content store of the operations center, the operations center including a receiving/recording module and an information dissemination module including an operations center list handling module;

forwarding an entire resource item list to the operations center list handling module;

receiving the entire resource item list at the operations center list handling module;

retrieving at the information dissemination module, the resource items identified by the resource item descriptors from the content store, wherein when multiple resource items match at least one of the resource item descriptors, the operations center list handling module selects at least one of the multiple resource items based on at least one consideration selected from a group of considerations comprising:

a result of an analysis of weighted user preferences in a user preference file maintained by the operations center; and a result of an analysis of weighted user preferences and determined characteristics of the client processing device obtained from polling the client processing device, the characteristics comprising formats in which the client processing device is configured to receive resource items;

providing from the information dissemination module, the retrieved resource items to the client processing device for presentation thereat;

wherein the receiving/recording module receives the resource items from an information source and forwards the resource items to the content store.

11. The method according to claim 10, where the obtaining includes receiving the resource item list from a remote repository of resource item lists.

12. The method according to claim 10, wherein the group of considerations further comprise a response to a query received from the client processing device.

13. The method according to claim 10, wherein the obtaining involves creating the resource item list from scratch at the client processing device.

14. A computer readable storage medium including machine readable instructions, that when executed by a processor, directs a computing device to perform the steps for implementing the method recited in claim 10.

15. A server apparatus for providing plural resource items, the apparatus comprising:

a content store providing plural resource items;

logic configured to receive a resource item list from a client processing device, the resource item list including plural resource item descriptors that identify resource items provided in the content store, wherein each resource item descriptor includes at least one attribute, the attribute comprising one of a Program Reference Number, a Program Title, a Program Airing Date, a Program Airing Service, a Program Airing Time, or a Program Duration;

logic configured to automatically retrieve the resource items identified by the resource item descriptors from the content store;

logic configured to discover, based on at least one consideration, at least one preferred resource item when multiple resource items match at least one of the resource item descriptors, the at least one consideration selected from a group of considerations comprising:

a result of an analysis of weighted user preferences in a user preference file maintained by the server apparatus; and a result of an analysis of weighted user preferences and determined characteristics of the client processing device obtained from polling the client processing device;

logic configured to provide the retrieved resource items to the client processing device for presentation thereat.

16. The apparatus according to claim 15, wherein the resource item list is expressed in a markup language.

17. The apparatus according to claim 16, wherein the markup language is the Extensible Markup Language (XML).

18. The apparatus according to claim 17, wherein a schema governs the contents and organization of the resource item list, the schema comprises at least one of:

MediaPlaylist;
MediaSequence;
programReferenceIdentifer;
programTitle;
programAiringDate;
programAiringService;
programAiringTimeUTC; or
programDurationMinutes.

19. The apparatus according to claim 15, wherein each resource item descriptor includes plural attributes, a subset of which are optional.

20. The apparatus according to claim 15, wherein the resource item list includes information that specifies an order in which the resource items are to be presented.

21. The apparatus according to claim 15, further including logic configured to select one of at least two resource items based on the at least one consideration.

22. The apparatus according to claim 21, wherein the at least one consideration pertains to a picture resolution of a rendering client presentation device that will render the selected resource item.

23. A computer readable storage medium including machine readable instructions, that when executed by a processor, directs the server apparatus to perform the steps of implementing the logic recited in claim 15.

24. A system for retrieving plural resource items, the system comprising:
a computer processing device, including:
logic configured to obtain a resource item list, the resource item list including plural resource item descriptors that identify respective resource items; and
logic configured to forward the resource item list to an operations center, the operations center including a receiving/recording module and an information dissemination module including an operations center list handling module;
the operations center including:
a content store for storing resource items;
logic configured to receive the resource item list;
logic configured to retrieve the resource items identified by the resource item descriptors in the resource item list from the content store;
logic configured to discover, based on at least one consideration, at least one preferred resource item when multiple resource items match at least one of the resource item descriptors, the at least one consideration selected from a group of considerations comprising:
a result of an analysis of weighted user preferences in a user preference file maintained by the operations center; and
a result of an analysis of weighted user preferences and determined characteristics of the client processing device obtained from polling the client processing device;
logic configured to provide the retrieved resource items to the client processing device for presentation thereat;
wherein the receiving/recording module receives the resource items from an information source and forwards the resource items to the content store.

25. The system according to claim 24, where the logic for obtaining is configured to receive the resource item list from a source entity, wherein the resource item list is a pre-existing resource item list.

26. The system according to claim 25, wherein the source entity is a remote repository of resource item lists.

27. The system according to claim 24, wherein the logic for obtaining is configured to create the resource item list, the resource item list written from scratch by a user.

28. A computer readable storage medium including machine readable instructions, that when executed by a processor, directs the computer processing device to perform the steps of implementing the logic recited in claim 24.

29. A computer readable storage medium including machine readable instructions, that when executed by a processor, directs a computing device to perform acts, the acts comprising:
receiving a user-created resource item list from a client processing device, the user-created resource item list including plural resource item descriptors that identify at least one or multiple audio/video media programs provided in the content store, wherein the content store comprises multiple distributed databases including pre-recorded sources and new resources archived in a real-time mode;
invoking the user-created resource item list;
automatically retrieving the audio/video media programs identified by the resource item descriptors from the content store, wherein when more than one audio/video media programs match at least one of the resource item descriptors, the automatically retrieving further comprises:
discovering weighted preference criteria associated with a user of the user-created resource item list, the act of discovering selected from a group comprising:
consulting a maintained file that identifies weighted user preferences pertaining to the user; and
polling the client processing device of the user to obtain weighted user preferences pertaining to the user and to determine formats in which the client processing device is configured to receive audio/video media programs;
determining a preferred audio/video media program based on an analysis of the weights of the weighted preference criteria;
alerting he user that the preferred audio/video media program is available for consumption; and
giving the user an opportunity to retrieve the preferred audio/video media program;
providing the retrieved audio/video media programs to the client processing device for a presentation thereat.

* * * * *